V. DIRIENZO.
PNEUMATIC TIRE.
APPLICATION FILED NOV. 30, 1921.
1,420,081.
Patented June 20, 1922.
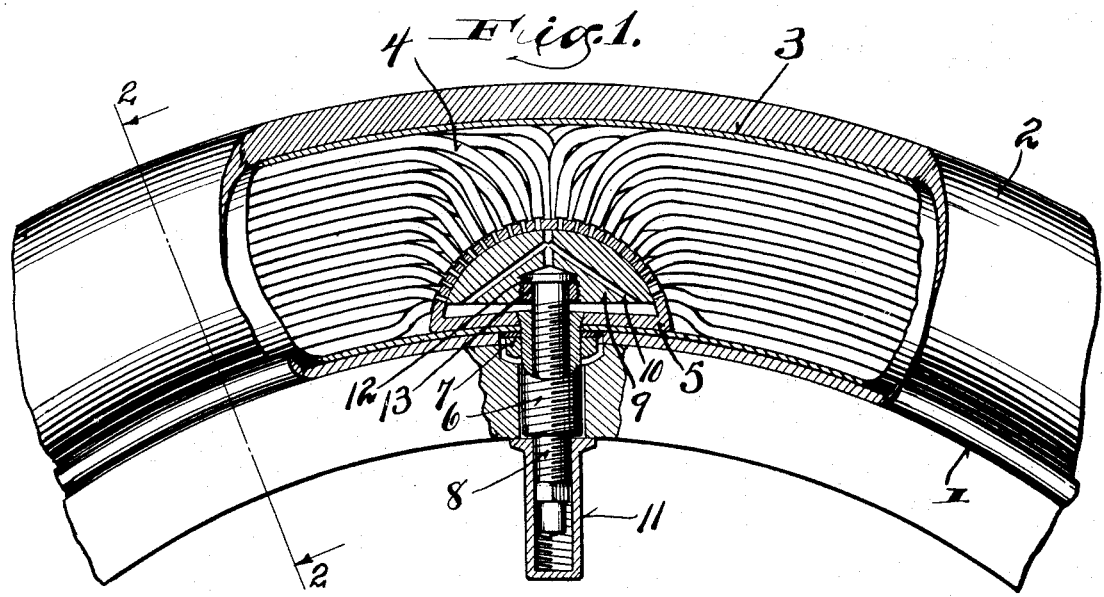
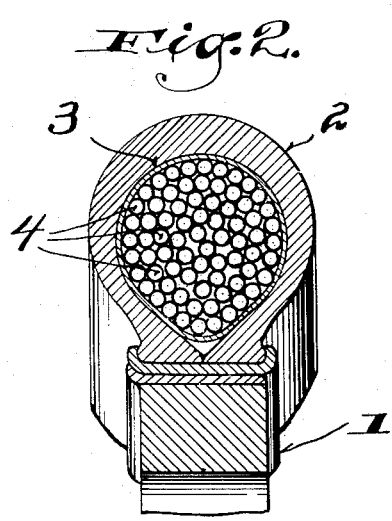
INVENTOR.
Vincent—Dirienzo
BY
Young & Young
ATTORNEYS

UNITED STATES PATENT OFFICE.

VINCENT DIRIENZO, OF MADISON, WISCONSIN.

PNEUMATIC TIRE.

1,420,081.  Specification of Letters Patent.  Patented June 20, 1922.

Application filed November 30, 1921. Serial No. 518,962.

*To all whom it may concern:*

Be it known that I, VINCENT DIRIENZO, a citizen of the United States, and resident of Madison, in the county of Dane and State of Wisconsin, have invented certain new and useful Improvements in Pneumatic Tires; and I do hereby declare that the following is a full, clear, and exact description thereof.

My invention relates to a new and useful improvement in pneumatic tires, and more especially to an inner tube which is inserted in an outer casing of the usual type.

The general object of my invention is to construct a tire which, although it may be punctured, will not entirely collapse.

A more specific object of the invention is to provide within the tube numerous airtight compartments, which are separated from each other so that in case a puncture is received by one or more of these compartments, the others will still retain the air which is compressed therein and the tire will be prevented from entirely collapsing.

With the above objects in view, my invention comprises certain features of construction which are hereinafter specifically described in connection with the accompanying drawing, in which:

Figure 1 is a sectional view taken radially through the tire and a portion of the rim, and Figure 2 is a cross-sectional view of the tire and rim taken on the line 2—2 of Figure 1.

In the drawing, the numeral 1 designates a rim of usual construction and 2 designates the usual outer casing of the tire. The inner tube, which is constructed according to my invention, includes an outer tube or housing 3 which is of substantially the same diameter as the tire casing, and within this tube I provide a large number of small tubes 4, the ends of which are attached to a valve chamber 5 and communicate with the interior thereof. The chamber 5 has one face which conforms substantially to the shape of the rim on which the tire is carried, and the remaining surface of the chamber is in the shape of a spherical segment. The chamber 5 is provided with a stem 6 which extends through the rim and felly when it is in operative position on the wheel, and is securely attached thereto by means of the nut and washer 7. A valve stem 8 extends through the stem 6 and is in threaded engagement therewith. This stem 8 carries at its inner end the valve 9 which is provided with one or more ducts 10, which afford communication between the valve chamber and the opening through the valve stem.

The valve 9 may be secured to the inner end of the stem 8 by means of the head 12 and the threaded collar 13. The valve is in the shape of a spherical segment of the same radius as the inner surface of the chamber, but of less altitude so that the valve may be adjusted to open or close communication between the small tubes and the valve chamber. This adjustment is effected by screwing the valve stem 8 within the stem 6. A cap 11 is provided for the stem 6.

From the foregoing description, it will be seen that each one of the numerous small tubes 4 constitutes a separate air chamber when the valve is adjusted so as to close the communication between the same and the valve chamber. In order to pump up the tire, the valve stem 8 is moved outwardly and the air pumped in through the stem and the ducts 10 into the valve chamber. This valve chamber being in communication with all of the small tubes, the resulting pressure will be equalized in all of them. When the pressure in the tire is sufficiently high, the valve stem may be screwed inwardly until the valve seats firmly against the spherical surface of the chamber, and thereby closes all of the tubes 4.

While I have described one form in which my invention may be embodied, it will be understood that various modifications may be made in the details thereof, without departing from the spirit of the invention, as hereinafter claimed.

I claim as my invention:

In a pneumatic tire, an outer housing, a plurality of small tubes inside thereof, a valve chamber within said outer housing and having one face shaped so as to conform substantially to the outer tire casing, and the remainder of its surface substantially in the shape of a spherical segment, said spherical portion having openings in communication with the respective small tubes, a valve in the shape of a spherical segment of the same radius as said spherical surface, but of less altitude than the chamber ducts leading through said valve and opening into the chamber, said valve being operable to close the communication between the chamber and each of the small tubes.

In testimony that I claim the foregoing I have hereunto set my hand at Madison, in the county of Dane and State of Wisconsin.

VINCENT DIRIENZO.